United States Patent

Fujita et al.

[11] Patent Number: 5,747,597
[45] Date of Patent: May 5, 1998

[54] CURABLE RESIN COMPOSITION AND COATING MATERIAL COMPOSITION

[75] Inventors: Yukiko Fujita, Sakai; Shinya Ueno, Tokyo; Yoko Kawasaki, Kishiwada; Kumiko Fukakusa, Takaishi; Hidefumi Matsuya, Izumiotsu; Tomomasa Mitani, Izumi; Akira Komori, Hirakata; Mika Matsumura, Izumiotsu, all of Japan

[73] Assignee: Dainippon Ink and Chemicals, Inc., Tokyo, Japan

[21] Appl. No.: 695,440

[22] Filed: Aug. 12, 1996

[30] Foreign Application Priority Data

Sep. 25, 1995 [JP] Japan ................... 7-245980
Jul. 19, 1996 [JP] Japan ................... 8-190978

[51] Int. Cl.$^6$ .................. C08L 67/07; C08F 299/02; C08F 299/04; C08F 299/06
[52] U.S. Cl. .................. 525/312; 525/263; 525/286; 525/302; 525/303; 525/308; 525/327.3; 525/385; 525/386
[58] Field of Search .................. 525/286, 302, 525/385, 386, 303, 305, 312, 327.3

[56] References Cited

U.S. PATENT DOCUMENTS 4,192,685  3/1980  Horike .................. 430/283

FOREIGN PATENT DOCUMENTS 54-21427  2/1979  Japan.

*Primary Examiner*—Fred Zitomer
*Attorney, Agent, or Firm*—Armstrong, Westerman, Hattori, McLeland & Naughton

[57] ABSTRACT

The present invention provides a curable resin composition comprising: a polymer (A) containing a polymerizable unsaturated bonding group; and a polymerizable unsaturated monomer (B). Polymerizable unsaturated monomer (B) comprises as an essential component an oligoalkyl($C_2$–$C_4$) ether(n=2–15)-monoalkoxy($C_1$–$C_{18}$)-(meth)acrylate. This curable resin composition according to the present invention displays superior adherence, air-drying, water resistance, and storage stability properties in addition to a reduced odor.

6 Claims, No Drawings

CURABLE RESIN COMPOSITION AND COATING MATERIAL COMPOSITION

BACKGROUND OF THE INVENTION

1. Field of the Invention

The present invention relates to a curable resin composition comprising, as an essential component, a specific oligoether methacrylate as a polymerizable unsaturated monomer possessing superior adherence, water resistance, storage stability and air drying properties, as well as reduced odor characteristics.

2. Related Art

Generally, thermosetting resins such as unsaturated polyester resins, epoxyacrylate resins, urethane acrylate resin and the like comprise compositions in which a styrene monomer is used as a polymerizable unsaturated monomer. In view of the formability and properties of the various products formed, standard styrene monomers employed as polymerizable unsaturated monomers of the aforementioned resin compositions serve as superior starting materials.

However, problems exist with regard to the use of the aforementioned due to their unpleasant odor, harmful properties, and the nature that polymerizing ability is prevented by the existence of oxygen (hereafter we refer to this nature as "anaerobic nature"); hence, use of the aforementioned resin compositions is quite limited. Furthermore, problems also exist with respect to the inferior adherence properties of the resin.

Processes exist with regard to reducing the aforementioned unpleasant odor, such as a method which uses a methacrylate in which a high solid content is achieved by means of an unsaturated polyester resin containing a dicyclopentadiene, as disclosed in Japanese Patent Application, First Publication Laid Open No. Sho 54-21427. However, such method are still insufficient in dealing with the aforementioned problems.

SUMMARY OF THE INVENTION

It is an object of the present invention to provide a curable resin composition which solves the aforementioned problems relating to the restriction of usage of styrene monomers due to their unpleasant odor, harmful properties and anaerobic nature, and which further exhibits improved adherence, water resistance and storage stability of the resin thereof.

In order to solve the aforementioned problems, the inventors of the present invention have achieved the present invention as a result of earnest and intense research with regard to polymerizable unsaturated monomers in place of styrene monomers and methacrylates.

Specifically, present invention provides a curable resin composition comprising: a polymer (A) containing a polymerizable unsaturated bonding, group (hereafter referred to as "polymer (A)"); and a polymerizable unsaturated monomer (B); wherein, said polymerizable unsaturated monomer (B) comprises as an essential component an oligoalkyl($C_2$–$C_4$)ether(n=2–15)-monoalkoxy($C_1$–$C_{18}$)-(meth)acrylate, preferably an oligoalkyl($C_2$–$C_4$)ether(n=2–10)-monoalkoxy($C_1$–$C_{18}$)-(meth)acrylate. In addition, polymer (A) preferably comprises at least one compound selected from the group consisting of unsaturated polyester (a), epoxy(meth)acrylate (b), urethane (meth)acrylate (c), unsaturated polyester (meth)acrylate (d), and a macromonomer (e) containing a polymerizable unsaturated bonding group at a molecular terminal thereof. The weight ratio of said polymer (A) containing a polymerizable unsaturated bonding group to said polymerizable unsaturated monomer (B) (A/B) is 90~5/10~95 (% by weight). The amount of said oligoalkyl($C_2$–$C_4$)ether(n=2–15)-monoalkoxy($C_1$–$C_{18}$)-(meth)acrylate to be contained in said polymerizable unsaturated monomer (B) is 2~100% by weight. In addition, a curable resin composition is provided according to the present invention further comprising 0~5 parts by weight of a wax per a total of 100 parts by weight of said polymer (A) and said polymerizable unsaturated monomer (B). Furthermore, the present invention also provides a coating material composition comprising a curable resin composition as described above.

Hence, by means of providing a curable resin composition of the present invention comprising: a polymer (A) containing a polymerizable unsaturated bonding group; and a polymerizable unsaturated monomer (B), wherein unsaturated monomer (B) comprises as an essential component an oligoalkyl($C_2$–$C_4$)ether(n=2–15)-monoalkoxy($C_1$–$C_{18}$)-(meth)acrylate, it is possible to provide a curable resin composition which displays superior adherence, air-drying, water resistance, and storage stability properties in addition to a reduced odor.

DETAILED DESCRIPTION OF THE PREFERRED EMBODIMENTS

In the following, the preferred embodiments of the present invention will be explained in detail.

As polymer (A), any resin containing a polymerizable unsaturated bonding group may be used, however said polymer (A) preferably comprises at least one compound selected from the group consisting of unsaturated polyester (a), epoxy(meth)acrylate (b), urethane (meth)acrylate (c), unsaturated polyester (meth)acrylate (d), and a macromonomer (e) containing a polymerizable unsaturated bonding group at a molecular terminal thereof.

The unsaturated polyester (a) for use according to the present invention preferably comprises a compound which can be obtained by means of a condensation reaction of a dibasic acid containing an α,β-unsaturated dibasic acid and a polyhydric alcohol; as necessary, a dicyclopentadiene compound can be used in the condensation reaction. When necessary, it is also possible to use a monobasic acid, monohydric alcohol, monoepoxy compound and the like. The average molecular weight of the aforementioned is preferably 500~5,000.

α,β-unsaturated dibasic acids used in the manufacture of the aforementioned unsaturated polyester include, for example, maleic acid, maleic anhydride, fumaric acid, itaconic acid, itaconic anhydride and the like. Saturated dibasic acids include, for example, phthalic acid, phthalic anhydride, halogenated phthalic anhydride, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutaric acid, adipic acid, sebacic acid, 1,12-dodecane dicarboxylic acid, 2,6-naphthalene dicarboxylic acid, 2,7-naphthalene dicarboxylic acid, 2,3-naphthalene dicarboxylic acid, 2,3-naphthalene dicarboxylic acid anhydride, 4,4'-biphenyldicarboxylic acid, as well as dialkylesters of the aforementioned, and the like. Monobasic acids include benzoic acid, stearic acid, oleic acid, linolenic acid, linoleic acid, palmitic acid and the like.

Polyhydric alcohols include, for example, ethylene glycol, diethylene glycol, triethylene glycol, polyethylene glycol, propylene glycol, dipropylene glycol, polypropylene glycol, 2-methyl-1,3-propane diol, 1,3-butane diol, neopentylglycol, bisphenol A hydroxide, 1,4-butane diol, adduct of bisphenol A and propylene oxide or ethylene oxide, 1,2,3,4-tetrahydroxybutane, glycerin, trimethylol propane, 1,3-propane diol, 1,2-cyclohexane glycol, 1,3-cyclohexane glycol, 1,4-cyclohexane glycol, 1,4-cyclohexane dimethanol, paraxylene glycol, dicyclohexyl-4,4'-diol, 2,6-decalin glycol, 2,7-decalin glycol, and the like. Monohydric alcohols include benzyl alcohol, hydroxy (dicyclopentadiene), cyclohexyl alcohol, 2-ethylhexyl alcohol, lauryl alcohol, stearyl alcohol, and the like.

In addition, it is also possible to introduce a sulfonic metal salt group into the unsaturated polyester (a) in order to impart hydrophilic properties. The starting materials of the aforementioned comprise a dibasic acid containing a sulfonic metal salt group or a monohydric alcohol (in the case of a dibasic acid, it possible to use a derivative capable of condensation): examples of the aforementioned include sodium salts of sulfoisophthalic acid, sulfoterephthalic acid, sulfophthalic acid, 4-sulfonaphthalene-2,7-dicarboxylic acid (or derivatives thereof), and the like. The starting materials for introducing the sulfonic metal salt group into the unsaturated polyester (a) comprise 0.1~20% by weight, preferably 3~5% by weight of the solid content of the unsaturated polyester.

The epoxy(meth)acrylate (b) for use according to the present invention indicates a di(meth)acrylate of, for example, a bisphenol-type epoxy resin, novolak-type epoxy resin, 1,6-naphthalene-type epoxy resin or the like, which is obtained by means of reacting any of the aforementioned epoxy resin (alone or in combination), comprising an average epoxy equivalent weight of preferably 150~450, and a unsaturated monobasic acid under the presence of an esterification catalyst.

Particularly representative examples of the aforementioned bisphenol-type epoxy resin include a glycidylether epoxy resin possessing a molecular structure comprising substantially at least two epoxy groups which is obtained by means of reacting an epichlorohydrine with bisphenol A or F; a dimethylglycidylether epoxy resin obtained by means of reacting a methylepichlorohydrine with bisphenol A or F; an epoxy resin obtained by means of reacting an alkyleneoxide adduct of bisphenol A or F with epichlorohydrine or methylepichlorohydrine; and the like.

In addition, particularly representative examples of the aforementioned novolak-type epoxy resin include an epoxy resin obtained by means of reacting a phenol novolak or a cresol novolak, and epichlorohydrine or methylepichlorohydrine, and the like.

Furthermore, particularly representative examples of the aforementioned unsaturated monobasic acid include acrylic acid, methacrylic acid, cinnamic acid, crotonic acid, sorbic acid, monomethylmaleate, monopropylmaleate, monobutylmaleate, mono (2-ethylhexyl) maleate, and the like.

These unsaturated monobasic acids can be used alone or in combinations of two or more. The aforementioned reaction between an epoxy resin and unsaturated monobasic acid is preferably conducted at a temperature of 60°~140° C., more preferably 80°~120° C., using an esterification catalyst.

As the esterification catalyst, any conventional compound may be used, however, particularly representative examples of the aforementioned include tertiary amines such as triethylamines, N,N-dimethylbenzylamines, N,N-dimethylaniline, diazabicyclooctane, and the like; diethylamine hydrochloride; and the like.

The number average molecular weight of the aforementioned epoxymethacrylate is preferably 450~5,000, more preferably 750~2,200. In the case when the average molecular weight is less than 450, a stickiness in the resultant cured material is generated, thereby degrading the strength properties, while an average molecular weight greater than 5,000 results in an increase in the curing time and a degradation of the productivity of the aforementioned.

The urethane methacrylate (c) for use according to the present invention is obtained by means of preferably reacting a polyisocyanate; a polyol, e.g., polyether polyol, polyester polyol, polybutadiene polyol, and the like; and a hydroxyalkyl methacrylic compound. For example, the aforementioned urethane methacrylate (c) can be obtained by reacting a polyisocyanate, obtained by reacting a polypropylene glycol and tolylenediisocyanate (TDI) in a 1:2 molar ratio, and 2-hydroxyethylmethacrylate in a 1:2 molar ratio.

The aforementioned polyether polyol is a polyalkylene polyol possessing a number average molecular weight of preferably at least 400, more preferably within the range of 400~5,000, and most preferably within the range of 400~3,000; examples of the aforementioned include polyoxypropylene diol (hereafter referred to as "PPG"), polytetramethylene glycol (hereafter referred to as "PTMG"), and the like.

In addition, the aforementioned polybutadiene polyol comprises a liquid polybutadiene-type liquid rubber possessing a highly reactive hydroxyl group at both terminal ends including a 1,4-vinyl bond and a 1,2-vinyl bond in its molecular structure; examples of the aforementioned include commercially available products such as a highly reactive hydroxy group at both terminal ends including 1,4-vinyl bond sold under the tradename Poly bd R-15HT (manufactured by Idemitsu-Atochem Co., Ltd.), 1,2-vinyl bond polybutadiene sold under the tradename NISSO-PB Series (manufactured by Nihon Soda Co., Ltd.), and the like. The number average molecular weight of this polybutadiene polyol is preferably within the range of 500~10,000, more preferably within the range of 1,000~5,000.

The urethane (meth)acrylate (c) according to the present invention possesses a molecular structure comprising at least one (meth)acryloyl group. This resin can, for example, be obtained by means of reacting a polyisocyanate, a polyol (e.g., polyether polyol), and a hydroxyl group-containing (meth)acrylic compound. This resin is preferably obtained by reacting the aforementioned compounds such that the equivalent amount of the isocyanate group and hydroxyl group are approximately equal: more concretely, a polyether polyol and a polyisocyanate are first reacted to produce an isocyanate group-containing prepolymer, which is then reacted with a hydroxyl group-containing, (meth)acrylic compound to yield the desired aforementioned resin.

Examples of the aforementioned polyisocyanate include 2,4-tolylene diisocyanate, isomers of the same and mixtures of said isomers (hereafter referred to as "TDI"), as well as diphenylmethane diisocyanate, hexamethylene diisocyanate, isophorone diisocyanate, xylene diisocyanate, hydrogenated xylylene diisocyanate, dicyclohexylmethane diisocyanate, tolidine diisocyanate, naphthaline diisocyanate, triphenylmethane triisocyanate, trimethylol propane TDI adducts sold under the tradename Burnock D-750, CRISVON NX (produced by Dainippon Ink & Chemicals, Inc.), DESMODUR DL (produced by Sumitomo-Bayer Co., Ltd.), CORONATE L (produced by Nihon Polyurethane Co., Ltd.), Takenate D102 (produced by Takeda Pharmaceutical Co.), Isonate 143L (produced by Mitsubishi Chemical Industries, Ltd.), and the like; these compounds may be used alone or in combinations of two or more. Among, the aforementioned diisocyanates, use of TDI is particularly preferred.

As the aforementioned hydroxyl group-containing (meth) acrylic compound, use of a hydroxyl group-containing methacrylate is preferred: example of the aforementioned include 2-hydroxyethyl (meth)acrylate, 2-hydroxypropyl (meth)acrylate, 3-hydroxybutyl (meth)acrylate; mono(meth) acrylates of alcohols containing two hydroxyl groups such as polyethylene glycol mono(meth)acrylate, polypropylene glycol mono(meth)acrylate; adducts of α-olefin epoxide and (meth)acrylic acid, adducts of carboxylic acid glycidyl ester and (meth)acrylic acid; partial (meth)acrylates of alcohols containing at least three hydroxyl groups such as di(meth) acrylates of tris(hydroxylethyl) isocyanuric acid, pentaerythritol tri(meth)acrylate and the like.

In addition, in the manufacture of the urethane (meth) acrylate (c) according to the present invention, it is possible to substitute compounds such as a hydroxyl group-containing allylether, higher alcohol or the like for a portion of the hydroxyl group-containing (meth)acrylic compound.

As the aforementioned hydroxyl group-containing allylether compound, any conventional compound may be used; particularly representative compounds among the aforementioned include allylether compounds of polyhydric alcohols such as ethylene glycol monoallylether, diethylene glycol monoallylether, triethylene glycol monoallylether, polyethylene glycol monoallylether, propylene glycol monoallylether, dipropylene glycol monoallylether, tripropylene glycol monoallylether, polypropylene glycol monoallylether, 1,2-butylene glycol monoallylether, 1,3-butylene glycol monoallylether, hexylene glycol monoallylether, octylene glycol monoallylether, trimethylolpropane diallylether, glycerine allylether, pentaerythritol triallylether, and the like. Use of an allylether compound possessing one hydroxyl group is preferred.

As the aforementioned higher alcohol, any conventional compound may be used; particularly representative examples of the aforementioned include decyl alcohol, undecyl alcohol, lauryl alcohol, tridecyl alcohol, stearyl alcohol, and the like.

As an example of a manufacturing process of the urethane (meth)acrylate (c) according to the present invention, there can be mentioned a method in which a polyether polyol and a polyisocyanate are reacted first to form a prepolymer possessing a terminal isocyanate group with a number average molecular weight of preferably 500~30,000, more preferably 700~5,000, and a NCO/OH ratio of 2~1.5. The aforementioned prepolymer is then reacted with a hydroxyl group-containing acrylic compound in a manner such that the equivalent weight of the hydroxyl group is approximately equal to that of the isocyanate group of the aforementioned prepolymer.

According to another method, the hydroxyl group-containing acrylic compound and polyisocyanate are first reacted to obtain an isocyanate group-containing compound, which is then reacted with a polyether polyol to form a urethane (meth)acrylate resin comprising a number average molecular weight of 500~30,000, preferably 700~5,000.

The unsaturated polyester (meth)acrylate (d) according to the present invention comprises an unsaturated polyester (meth)acrylate obtained by means of reacting, a (meth) acrylic compound at the terminal end of an unsaturated polyester.

Examples of the aforementioned (meth)acrylic compound include unsaturated glycidyl compounds; unsaturated monobasic acids, such as acrylic acid, methacrylic acid and the like; glycidyl esters of unsaturated monobasic acids, such as glycidylacrylate, glycidylmethacrylate; and the like. Use of a glycidylmethacrylate is preferred. The number average molecular weight of this resin is preferably 1,500~3,000.

The macromonomer (e) possessing a polymerizable, unsaturated bonding group at a molecular chain terminal according to the present invention comprises a resin possessing a polymerizable, unsaturated bonding group at the molecular chain terminal, wherein said resin is preferably a vinyl polymer with 50° C. or greater of Tg, and wherein said polymerizable, unsaturated bonding group comprises at least one type of group selected from among (meth)acryloyl group, styryl group, allyl group and vinylether group. Use of various cure accelerators is common when attempting to impart air-drying properties to the aforementioned resins (a)~(d); however, the amount of the cure accelerator is smaller with macromonomer (e) when compared with resins (a)~(d), as this resin normally exhibits superior storage stability when compared with the other resins.

The aforementioned resin can be synthesized by the following methods, however, this synthesis is not limited to just these methods; additionally, commercially available products, such as polymethylmethacrylate type macromonomers sold under the tradenames Macromonomers AA-6, AA-10, polystyrene type macromonomer (PSt) sold under the tradename Macromonomer A-6, and styrene acrylonitrile copolymer type macromonomer (St-AN) sold under the tradename Macromonomer AN-6 (produced by Toa Synthetic Chemical Industries, K.K.) can be used alone or in joint combination.

The macromonomer (e) possessing a (meth)acryloyl group for use according to the present invention is a vinyl polymer which is synthesized, for example, by reacting glycidyl(meth)acrylate or the like with a polymer possessing a terminal carboxyl group (hereafter referred to as "terminal carboxyl group-containing prepolymer") obtained by radical polymerization of a vinyl monomer under the presence of a chain transfer agent such as mercaptoacetate or the like.

The macromonomer (e) possessing a styryl group for use according to the present invention is a vinyl polymer which is synthesized, for example, by neutralizing the carboxyl group of a terminal carboxyl group-containing prepolymer, and then reacting this prepolymer with chloromethylstyrene.

The macromonomer (e) possessing an allyl group for use according to the present invention is a vinyl polymer which is synthesized, for example, by reacting an allyl glycidylether or the like with a terminal carboxyl group-containing prepolymer.

The macromonomer possessing a vinylether group for use according to the present invention is a vinyl polymer which is synthesized, for example, by reacting a polymer possessing a terminal hydroxyl group (hereafter referred to as "terminal hydroxyl group-containing prepolymer") obtained by radical polymerization of a vinyl monomer under the presence of a chain transfer agent such as mercaptoethanol or the like; a polyisocyanate, e.g., tolylene diisocyanate; and a glycol monovinylether, e.g., butanediol monovinylether.

Examples of the aforementioned vinyl monomer include vinyl acetate, styrene, styrene substitution products, methyl (meth)acrylate, ethyl(meth)acrylate, propyl(meth)acrylate, butyl(meth)acrylate, 2-ethylhexyl(meth)acrylate, 2-hydroxyethyl(meth)acrylate, hydroxypropyl (meth) acrylate, glycidyl (meth)acrylate, (meth)acrylonitrile, (meth)acrylamide, maleic anhydride, N-vinylpyrolidone, vinylchloride, vinylidene chloride, phenylmaleimide, and the like. These aforementioned compounds may be used alone or in joint combination. However, there are occasions when use of vinyl acetate, 2-hydroxyethyl(meth)acrylate, hydroxypropyl(meth)acrylate, glycidyl (meth)acrylate, maleic anhydride and the like are inappropriate as a result of a reaction process imparting a polymerizable, unsaturated group within the vinyl monomer.

The number average molecular weight of the macromonomer (e) can be designated by means of selecting appropriate amounts of a chain transfer agent and polymerization initiator for adding to the polymerization system; the number average molecular weight (Mn) of the macromonomer is 1,000–40,000, preferably 2,000–25,000. Furthermore, the number average molecular weight in the present invention means the number average molecular weight by means of polystyrene conversion using gel permeation chromatography (hereafter referred to as "GPC").

As the aforementioned radical polymerization method, it is possible to use a solution polymerization method, bulk polymerization method or suspension polymerization method; among the aforementioned, the preferred method is the suspension polymerization method.

As the polymerization initiator, any conventional azo-type initiator and/or peroxide initiator can be employed, however, use of an azo-type initiator is preferred to avoid reaction with the mercaptan compound. Examples of the aforementioned azo-type initiator include, 2,2-azobisisobutyronitrile (hereafter referred to as "AIBN"), 4,4-azobis-4-cyanovalerylic acid, 1-azobis-1-cyclohexane carbonitrile, and the like.

The aforementioned chain transfer agent includes use of any mercaptan chain transfer agent possessing a carboxyl group such as mercaptoacetate, 2-mercaptopropionate, 3-mercaptopropionate, and the like. As the aforementioned hydroxyl group-containing chain transfer agent, thioethanol, thiopropanol and the like can be used.

The reaction between the terminal carboxyl group-containing prepolymer and the compound possessing a (meth)acryloyl group, allyl group and/or styryl group can be conducted using either of the aforementioned solution polymerization or bulk polymerization methods; however, in the case of the solution polymerization method, it is preferred that the prepolymer be synthesized using a suspension polymerization method, and the reaction be conducted using a polymerizable unsaturated monomer as the solvent. In the case of the bulk polymerization method, it is preferred that the prepolymer be synthesized using a suspension polymerization method, and the reaction be conducted using a kneading machine in a melt state under applied heat. In either case, a reaction catalyst such as tetrabutylphosphonium bromide or the like may be used.

The reaction between the hydroxyl group-containing prepolymer and the vinylether group-containing compound can be performed by means of either of the aforementioned solution polymerization or bulk polymerization methods. However, it is preferred that the prepolymer be synthesized using a suspension polymerization method, and the reaction between the prepolymer and polyisocyanate be conducted using a polymerizable unsaturated monomer as the solvent according to the solution polymerization method. In the case of the urethane forming reaction, it is possible to use a reaction catalyst such as tributyl tin and the like.

As the glycol monovinylether, there can be mentioned ethylene glycol monovinylether, butane diol monovinylether, cyclohexane dimethanol monovinylether, diethylene glycol monovinylether, hexane diol monovinylether, and the like: these compounds may be used alone or in combinations of two or more. Among the aforementioned glycol monovinylethers, use of butane diol monovinylether is particularly preferred.

An oligoalkyl($C_2$–$C_4$)ether(n=2–15)-monoalkoxy($C_1$–$C_{18}$)-(meth)acrylate, preferably an oligoalkyl($C_2$–$C_4$) ether(n=2–10)-monoalkoxy($C_1$–$C_{18}$)-(meth)acrylate comprising an essential component of the polymerizable unsaturated monomer (B) for used according to the present invention is represented by general formulas (I) through (III) below.

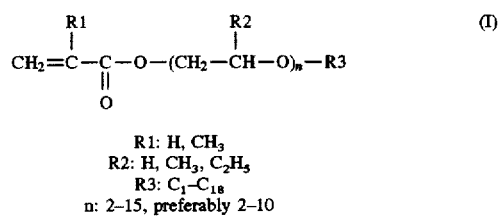

R1: H, $CH_3$
R2: H, $CH_3$, $C_2H_5$
R3: $C_1$–$C_{18}$
n: 2–15, preferably 2–10

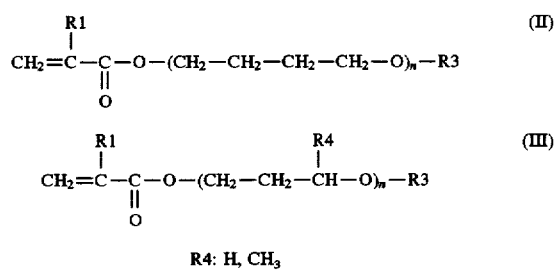

R4: H, $CH_3$

In the oligoalkyl($C_2$–$C_4$)ether(n=2–15)-monoalkoxy($C_1$–$C_{18}$)-(meth)acrylate, the oligoalkylether unit may be an isomer or a mixture of isomers of the oligoalkylether units shown in the above formulas (I) through (III).

Concrete examples of the oligoalkyl($C_2$–$C_4$)ether(n=2–15)-monoalkoxy($C_1$–$C_{18}$)-(meth)acrylate include: diethylene glycol monomethylether (meth)acrylate, diethylene glycol monoethylether (meth)acrylate, diethylene glycol monopropylether (meth)acrylate, diethylene glycol monobutylether (meth)acrylate, diethylene glycol monopentylether (meth)acrylate, diethylene glycol monohexylether (meth)acrylate, diethylene glycol mono 2-ethylhexylether (meth)acrylate, diethylene glycol monolaurylether (meth) acrylate, diethylene glycol monostearylether (meth)acrylate, dipropylene glycol monomethylether (meth)acrylate, dipropylene glycol monoethylether (meth)acrylate, dipropylene glycol monopropylether (meth)acrylate, dipropylene glycol monobutylether (meth)acrylate, dipropylene glycol monopentylether (meth)acrylate, dipropylene glycol monohexylether (meth)acrylate, dipropylene glycol mono 2-ethylhexylether (meth)acrylate, dipropylene glycol monolaurylether (meth)acrylate, dipropylene glycol monostearylether (meth)acrylate, tripropylene glycol monomethylether (meth)acrylate, dimethyl 4,8-dioxanonyl (meth)acrylate, trimethyl 4,8,12-trioxatridecyl (meth) acrylate, 5,10-dioxaundecyl (meth)acrylate, 5,10,15-trioxahexadecyl (meth)acrylate, 2,6-dioxanonylalcohol (meth)acrylate, 2,6,10-trioxatridecylalcohol (meth)acrylate, 2,7-dioxaundecylalcohol (meth)acrylate, 2,7,12-trioxahexadecylalcohol (meth)acrylate, and the like: these monomers may be used effectively alone or in combinations of two or more. In the case when water resistance properties are required, use of dipropylene glycol monomethylether (meth)acrylate (carbon atoms=3, n=2, C1) is particularly preferred. In the case when hydrophilic properties are required, use of diethylene glycol monomethylether (meth) acrylate is particularly preferred. As in the aforementioned, these monomers can be used alone, or mixed and used together.

With regard to the mixing ratio of resin composition A to B according to the present invention, 90~5 parts by weight of polymer (A) and 10~95 parts by weight of polymerizable unsaturated monomer (B) are preferably dissolved and mixed in a reciprocal manner. More preferably, 15~70 parts by weight of polymer (A) is dissolved in 85~30 parts by weight of polymerizable unsaturated monomer (B) to form the aforementioned composition.

In the polymerizable unsaturated monomer (B) according to the present invention, it is possible to jointly use any unsaturated monomer and unsaturated oligomer conventionally used in unsaturated polyester resins which can crosslink with an unsaturated polyester resin, as long as the aforementioned does not reduce the effects of the present invention. Examples of such unsaturated monomers include, for example, styrene, α-methylstyrene, chlorostyrene, dichlorostyrene, divinylbenzene, t-butylstyrene, vinyltoluene, vinyl acetate, diallylphthalate, triallylcyanurate, acrylic esters, (meth)acrylic esters, methyl (meth)acrylate, ethyl (meth)acrylate, n-butyl (meth)acrylate, i-butyl (meth)acrylate, t-butyl (meth)acrylate, 2-ethylhexyl (meth)acrylate, lauryl (meth)acrylate, cyclohexyl (meth) acrylate, benzyl (meth)acrylate, stearyl (meth)acrylate, tridecyl (meth)acrylate, dicyclopentenyloxyethyl (meth) acrylate, ethylene glycol monomethylether (meth)acrylate, ethylene glycol monoethylether (meth)acrylate, ethylene glycol monobutylether (meth)acrylate, ethylene glycol monohexylether (meth)acrylate, ethylene glycol mono-2-ethylhexylether (meth)acrylate, propylene glycol monomethylether (meth)acrylate, propylene glycol monoethylether, propylene glycol monobutylether (meth)acrylate, (meth) acrylate, propylene glycol monohexylether (meth)acrylate, propylene glycol mono-2-ethylhexylether (meth)acrylate, ethylene glycol di(meth)acrylate, diethylene glycol di(meth) acrylate, triethylene glycol di(meth)acrylate, neopentyl glycol di(meth)acrylate, trimethylolpropane tri(meth)acrylate, pentaerythritol tetra(meth)acrylate, dipentaerythritol penta (meth)acrylate, dipentaerythritol hexa(meth)acrylate, and the like.

The amount of the monomer possessing at least two unsaturated bonding groups to be added to the polymerizable unsaturated monomer (B) is 0~25% by weight, preferably 0~15% by weight.

In addition, a polymerization inhibitor is preferably used in this resin composition. Examples of this polymerization inhibitor which can be added to the above resin composition include: cresol, toluhydroquinone, 1,4-naphtoquinone, parabenzoquinone, hydroquinone, hydroquinone monomethylether, p-tert-butylcatechol, 2,6-di-tert-butyl-4-methyphenol and the like. Preferably 10~1,000 ppm of the aforementioned polymerization inhibitor are added to the above resin composition.

As the aforementioned wax (C) for use in the curable resin composition according to the present invention, it is possible to use paraffin wax and/or a polar wax (alone or in combination). Concrete examples of the aforementioned polar wax include waxes which possess both a polar and non-polar groups in the molecular structure, such as EMANON 3199, 3299 (produced by Kao, K.K.), RIKE-MAL S-71-D, S-200 (produced by Riken Vitamin, K.K.), NPS-8070, NPS-9125, OX-WEISSEN-8 (produced by Nihon Seiro, K.K.), and DIACARNA PAX-30 (produced by Mitsubishi Chemical Industries, K.K.).

The amount of wax to be added is 0~5 parts by weight, preferably 0.1~2.0 parts by weight per total 100 parts by weight of the aforementioned polymer (A) and polymerizable unsaturated monomer (B).

In order to speed the curing, a curing agent, e.g., organic peroxide, is preferably incorporated into the curable resin composition according to the present invention. Concrete examples of the aforementioned include conventional agents such as diacylperoxides, peroxy esters, hydroperoxides, dialkylperoxides, ketone peroxides, peroxyketals, alkylperesters, percarbonates, and the like.

The addition amount of the curing agent is 0.1~6 parts by weight per total 100 parts by weight of the aforementioned polymer (A) and polymerizable unsaturated monomer (B). The aforementioned curing agent(s) may also be used in combinations of two or more.

It is also possible to include a cure accelerator into the curable resin composition according to the present invention. As the cure accelerator, there can be mentioned metal soaps, e.g., cobalt naphthenate, cobalt octylate, zinc octylate, vanadium octylate, copper naphthenate, barium naphthenate, and the like; metal chelate compounds, e.g., vanadium acetyl acetate, cobalt acetyl acetate, iron acetyl acetate, and the like; and amines, such as, N,N-substituted anilines, N,N-substituted-p-toluidine, 4-(N,N-substituted amino) benzaldehydes, and the like, e.g., aniline, N,N-dimethylaniline, N,N-diethylaniline, p-toluidine, N,N-dimethyltoluidine, N,N-bis (2-hydroxyethyl)-p-toluidine, 4-(N,N-dimethylamino) benzaldehyde, 4-(N,N-bis (2-hydroxyethyl) amino) benzaldehyde, 4-(methylhydroxyethylamino) benzaldehyde, N,N-bis (2-hydroxypropyl)-p-toluidine, N-ethyl-m-toluidine, triethanol amine, m-toluidine, diethylene triamine, pyridine, phenylmorpholine, pipyridine, N,N-bis (hydroxyethyl) aniline, diethanol aniline.

The addition amount of the cure accelerator is preferably 0.1~5 parts by weight per total 100 parts by weight of the aforementioned polymer (A) and polymerizable unsaturated monomer (B). According, to the present invention use of an amine promoter is preferred. The cure accelerator can be added to the resin in advance, or at the time of usage.

According to the present invention, it is also possible to use various additives such as a filler, UV absorber, pigments, thickner, low shrinkage additive, antioxidant, plasticizer, aggregate, flame retardant, stabilizing agent, reinforcing agent, light curing agent, and the like.

As the filler, there can be mentioned, for example, hydraulic silicates, calcium carbonate powder, clay, alumina powder, talc, barium sulfate, silica powder, glass powder, glass beads, mica, aluminum hydroxide, cellulose, silica sand, river sand, marble waste, crushed stone and the like.

In addition, specific examples of the coating material using a resin composition according to the present invention include construction materials which do not give off unpleasant odors, particularly at the time of use or production, e.g., paints, floor and wall surface coating matrial, road marking materials, road paving materials, lining materials and the like. Furthermore, it is also possible to apply the aforementioned as a molding resin starting, material to a wide range of uses such as in electronic parts, household electric parts, automobile parts, medical equipment, cosmetics and the like.

In the following, the present invention will be explained in greater detail by means of the Examples; however, the present invention is not limited to these examples. In addition, hereafter use of the term "parts" signifies "parts by weight".

EXAMPLE 1

Unsaturated Polyester Resin Composition 604 parts of propylene glycol and 830 parts of isophthalic acid were placed in a 3 liter flask containing four openings equipped with a thermometer, stirrer, inert gas introduction opening, and reflux condenser, respectively. The mixture was heated to 210° C. under a nitrogen atmosphere and allowed to react for 10 hours; upon reaching a solid acid value of 1, the mixture was cooled to 120° C. followed by addition of 245 parts of maleic anhydride. After the temperature was raised to 205° C. and allowed to react for 10 hours, 969 parts of diethylene glycol monomethylether (meth)acrylate and 0.10 parts of toluhydroquinone were added to produce a resin composition with a nonvolatile content of 60.0%, an acid value of 18.3 and a Gardner viscosity of Y. The resultant resin composition was then placed through the following evaluation tests, and the results are shown in Table 1.

<Evaluation Method>

I. Reduced odorous properties

The odor of the resin composition was evaluated by means of placing the resin composition at a distance of 30 cm from the nose: "O" indicates the absence of a detectable odor, while "X" indicates the presence of a detectable odor.

II. Air-drying properties 0.5 parts of 6% Co-Naph, 0.5 parts of dimethylaniline and 2 parts of 50% benzoylperoxide were added per 100 parts of the resin composition, in addition to wax at 130°, 135°, 140° and 145° F. The state of the resin composition following curing was evaluated by means of touch (i.e., dry-to-touch): "O" indicates drying within 1 hour, while "X" indicates insufficient drying within 1 hour following curing.

III. Tensile strength and tensile extension ratio 0.5 parts of dimethylaniline and 2 parts of 50% benzoylperoxide were added per 100 parts of the resin composition, and the mixture was deaerated following stirring to form a cast plate of thickness 2 mm. After allowing the cast plate to sit at room temperature for 24 hours, "after-curing" was conducted at 120° C. for 2 hours to produce a tension test piece specimen. This test piece specimen was then evaluated (measured) for tensile strength and tensile extension ratio.

IV. Adherence properties

The cast plate of thickness 2 mm was placed on top of a glass plate, and pressure was applied thereon for 10 minutes at 1 gf/cm$^2$. The adherence properties to the glass plate were then evaluated: "O" indicates extreme difficulty in tearing away the cast plate; "Δ" indicates that the cast plate was easily torn away; while "X" indicates the complete absence of any adherence.

V. Dispersibility in water and curability during water mixing 10 parts of water were added per 100 parts of the resin composition followed by stirring for 1 minute. The state of the mixture was then evaluated by observation 30 minutes later. 0.5 parts of dimethylaniline and 2 parts of 50% benzoylperoxide were then added per 100 parts of the specimen (after 30 minutes), and the cured state was observed: "O" indicates the mixing, of water and resin; while "X" indicates the separation of water and resin into two layers. Similarly, "O" indicates the curing of water and resin in a mixed state; while "−" indicates the failure to cure.

EXAMPLE 2

Unsaturated Polyester Resin Composition 604 parts of propylene glycol, 370 parts of phthalic anhydride and 490 parts of maleic anhydride were placed in a 3 liter flask containing four openings equipped with a thermometer, stirrer, inert gas introduction opening, and reflux condenser, respectively. The mixture was heated to 215° C. under a nitrogen atmosphere and allowed to react for 13 hours. Subsequently, 1345 parts of diethylene glycol monomethylether methacrylate and 0.06 parts of toluhydroquinone were added to produce a resin composition with a nonvolatile content of 50.0%, an acid value of 7.2 and a Gardner viscosity of Q-R. The resultant resin composition was then placed through the same evaluation tests as in Example 1, and the results are shown in Table 1.

EXAMPLE 3

Unsaturated Polyester Resin Composition 380 parts of dicyclopentadiene, 262 parts of maleic anhydride and 52 parts of water were placed in a 2 liter flask containing four openings equipped with a thermometer, stirrer, inert gas introduction opening, and reflux condenser, respectively. The mixture was heated to 1 30° C. under a nitrogen atmosphere and allowed to react for 5 hours; upon reaching a solid acid value of 210, the mixture was cooled to 120° C. followed by addition of 109 parts of ethylene glycol. After the temperature was raised to 185° C. and allowed to react for 10 hours, 773 parts of diethylene glycol monomethylether methacrylate and 0.08 parts of toluhydroquinone were added to produce a resin composition with a nonvolatile content of 50.0%, an acid value of 11.0 and a Gardner viscosity of C. The resultant resin composition was then placed through the same evaluation tests as in Example 1, and the results are shown in Table 1.

EXAMPLE 4

Unsaturated Polyester Resin Composition 173 parts of neopentylglycol, 347 parts of bisphenol A-ethylene oxide 2 mole adduct and 261 parts of isophthalic acid were placed in a 2 liter flask containing four openings equipped with a thermometer, stirrer, inert gas introduction opening, and reflux condenser, respectively. The mixture was heated to 215° C. under a nitrogen atmosphere and allowed to react for 10 hours; upon reaching a solid acid value of 1, the mixture was cooled to 120° C. followed by addition of 183 parts of fumaric acid. The temperature was then raised to 200° C. and allowed to react for 4 hours until reaching a solid acid value of 64, at which point it was cooled to 130° C. After 146 parts of glycidylmethacrylate were added and allowed to react for 3 hours at 130° C., 700 parts of diethylene glycol monomethylether methacrylate and 0.08 parts of toluhydroquinone were added to produce a resin composition with a nonvolatile content of 60.0%, an acid value of 38.6 and a Gardner viscosity of Z. The resultant resin composition was then placed through the same evaluation tests as in Example 1, and the results are shown in Table 1.

EXAMPLE 5

Epoxyacrylate Resin Composition 215 parts of methacrylic acid, 0.35 parts of hydroquinone and 2.1 parts of triethylamine were added to 458 parts of a polypropyleneglycol sold under the tradename Epicrone 850 (an epoxy resin produced by Dainippon Ink and Chemicals, Inc.) obtained by means of reacting bisphenol A and epicroylhydroline and possessing an epoxy equivalent amount of 189, and allowed to react for 6 hours at a temperature of 110° C. 673 parts of diethylene glycol monomethylether methacrylate and 0.06 parts of toluhydroquinone were subsequently added to produce a resin composition with a nonvolatile content of 50.0%, and a Gardner viscosity of W. The resultant resin composition was then placed through the same evaluation tests as in Example 1, and the results are shown in Table 1.

EXAMPLE 6

Urethane Methacrylate Resin Composition 283 parts of Mitsui Polyol Diol 700 (produced by Mitsui Toatsu Chemicals, K.K.) and 144 parts of TDI were placed in a 1 liter flask containing four openings equipped with a thermometer, stirrer, inert gas introduction opening, and reflux condenser, respectively. The mixture was maintained at a temperature of 80° C. under a nitrogen atmosphere and allowed to react for 5 hours until a theoretical NCO equivalent amount of 516 was confirmed. The mixture was cooled to 30° C., and 109 parts of 2-hydroxyethylmethacrylate were added and allowed to react for 4 hours at 80° C., at which point a NCO % of 0.1% by weight was produced. 358 parts of diethylene glycol monomethylether methacrylate, 0.08 parts of toluhydroquinone and 0.026 parts of tertiary butyl-catechol were then added to produce a resin composition with a nonvolatile content of 60.0%, and a Gardner viscosity of P. The resultant resin composition was then placed through the same evaluation tests as in Example 1, and the results are shown in Table 1.

TABLE 1

| Example | 1 | 2 | 3 | 4 | 5 | 6 |
| --- | --- | --- | --- | --- | --- | --- |
| •Reduction of odorous properties | O | O | O | O | O | O |
| •Air-Drying | O | O | O | O | O | O |
| •Tensile Strength [kgf/cm2] | 107.4 | 164.0 | 150.0 | 48.2 | 170.0 | 52.0 |
| •Tensile Extension Ratio [%] | 60.0 | 15.0 | 10.0 | 117.5 | 10.0 | 70.0 |
| •Adherence Hydrophilic Properties | O | O | O | O | O | O |
| •H$_2$O dispersibility | O | O | O | O | O | O |
| •Curability | O | O | O | O | O | O |

EXAMPLE 7

Unsaturated Polyester Resin Composition 456 parts of propylene glycol, 444 parts of phthalic anhydride and 294 parts of maleic anhydride were placed in a 2 liter flask containing four openings equipped with a thermometer, stirrer, inert gas introduction opening, and reflux condenser, respectively. The mixture was heated to 210° C. under a nitrogen atmosphere and allowed to react for 15 hours, at which point a solid acid value of 30 was reached. 726 parts of dipropylene glycol monomethylether methacrylate and 0.18 parts of toluhydroquinone were then added to produce a resin composition with a nonvolatile content of 60.0%, an acid value of 18.3 and a Gardner viscosity of X. The resultant unsaturated polyester resin composition was then placed through the following evaluation tests, and the results are shown in Table 2.

<Evaluation Method>

I. Reduced odorous properties

The odor of the resin composition was evaluated by means of the same method as described above in Example 1.

II. Air-drying, properties 0.5 parts of 6% Co-Naph, 0.3 parts of N,N-bis-(2-hydroxyethyl)-p-toluidine and 2 parts of 50% benzoylperoxide were added per 100 parts of the resin composition, in addition to wax at 130°, 135°, 140° and 145° F. The state of the resin composition following curing was evaluated by means of touch (i.e., dry-to-touch): "O" indicates drying within 1 hour; "Δ" indicates drying within 3 hours; while "X" indicates insufficient drying, within 3 hours following curing.

III. Tensile strength, tensile extension ratio and coefficient water absorption 0.3 parts of N,N-bis-(2-hydroxyethyl)-p-toluidine and 2 parts of 50% benzoylperoxide were added per 100 parts of the resin composition, and the mixture was deaerated following stirring to form a cast plate of thickness 2 mm. After allowing the cast plate to sit at room temperature for 24 hours, "after-curing" was conducted at 80° C. for 5 hours to produce a test piece specimen for testing tension and water absorption. This test piece specimen was then evaluated (measured) for tensile strength, tensile extension ratio and coefficient water absorption.

EXAMPLE 8

Unsaturated Polyester Resin Composition 173 parts of neopentylglycol, 347 parts of bisphenol A-ethylene oxide 2 mole adduct and 261 parts of isophthalic acid were placed in a 2 liter flask containing four openings equipped with a thermometer, stirrer, inert gas introduction opening, and reflux condenser, respectively. The mixture was heated to 215° C. under a nitrogen atmosphere and allowed to react for 10 hours; upon reaching a solid acid value of 1, the mixture was cooled to 120° C. followed by addition of 183 parts of fumaric acid. The temperature was then raised to 200° C. and allowed to react for 4 hours until reaching a solid acid value of 64, at which point it was cooled to 130° C. After 146 parts of glycidylmethacrylate were added and allowed to react for 3 hours at 130° C., 700 parts of dipropylene glycol monomethylether methacrylate and 0.08 parts of toluhydroquinone were added to produce a resin composition with a nonvolatile content of 60.0%, an acid value of 38.6 and a Gardner viscosity of V. The resultant resin composition was then placed through the same evaluation tests as in Example 7, and the results are shown in Table 2.

EXAMPLE 9

Epoxyacrylate Resin Composition 215 parts of methacrylic acid, 0.35 parts of hydroquinone and 2.1 parts of triethylamine were added to 458 parts of Epicrone 850 (an epoxy resin produced by Dainippon Ink and Chemicals, Inc.) obtained by means of reacting bisphenol A and epicroylhydroline and possessing an epoxy equivalent amount of 189, and allowed to react for 6 hours at a temperature of 110° C. 673 parts of dipropylene glycol monomethylether methacrylate and 0.06 parts of toluhydroquinone were subsequently added to produce a resin composition with a nonvolatile content of 50.0%, and a Gardner viscosity of R–S. The resultant resin composition was then placed through the same evaluation tests as in Example 7, and the results are shown in Table 2.

EXAMPLE 10

Urethane Methacrylate Resin Composition 283 parts of Mitsui Polyol Diol 700 (produced by Mitsui Toatsu Chemicals, K.K.) and 144 parts of TDI were placed in a 1 liter flask containing four openings equipped with a thermometer, stirrer, inert gas introduction opening, and reflux condenser, respectively. The mixture was maintained at a temperature of 80° C. under a nitrogen atmosphere and allowed to react for 5 hours until a theoretical NCO equivalent amount of 516 was confirmed. The mixture was cooled to 30° C., and 109 parts of 2-hydroxyethylmethacrylate were added and allowed to react for 4 hours at 80° C., at which point a NCO % of 0.1% by weight was produced. 358 parts of dipropylene glycol monomethylether methacrylate, 0.08 parts of toluhydroquinone and 0.026 parts of tertiary butylcatechol were then added to produce a resin composition with a nonvolatile content of 60.0%, and a Gardner viscosity of P. The resultant resin composition was then placed through the same evaluation tests as in Example 7, and the results are shown in Table 2.

EXAMPLE 11

Urethane Methacrylate/unsaturated Polyester Resin Composition 593 parts of triethylene glycol, 206 parts of diethylene glycol, 305 parts of phthalic anhydride, 490 parts of 3-methyltetrahydrophthalic anhydride and 0.158 parts of toluhydroquinone were placed in a 2 liter flask containing four openings equipped with a thermometer, stirrer, inert gas introduction opening, and reflux condenser, respectively. The mixture was heated to 205° C. under a nitrogen atmosphere and allowed to react for 15 hours; upon reaching a solid acid value of 15, the mixture was cooled to 120° C. followed by addition of 87 parts of maleic anhydride. The temperature was then raised to 190° C. and allowed to react for 5 hours until reaching a solid acid value of 24, at which point it was cooled to 160° C. After 148 parts of CARDURA E-10 (an epoxy compound produced by Shell Chemicals Co., Ltd.) were added and allowed to react for 3 hours at 130° C., 1078 parts of dipropylene glycol monomethylether methacrylate were then added to produce a resin composition with a nonvolatile content of 60.0%, an acid value of 1.1 and a Gardner viscosity of S–T. 80 parts of the resin of Example 10 were then added to 20 parts of the above resin to produce a resin composition with a nonvolatile content of 60.0%, an acid value of 2.9 and a Gardner viscosity of P–Q. The resultant resin composition was then placed through the same evaluation tests as in Example 7, and the results are shown in Table 2.

EXAMPLE 12

A resin composition was produced as in Example 11 with the exception that diethylene glycol monomethylether methacrylate was used in place of dipropylene glycol monomethylether methacrylate. These results are shown in Table 2.

EXAMPLE 13

Urethane Methacrylate/unsaturated Polyester/ Epoxyacrylate Resin Composition 159.2 parts of a polypropyleneglycol sold under the tradename Mitsui Polyol Diol 400 (produced by Mitsui Toatsu Chemicals, K.K.) and 118.3 parts of TDI were placed in the same apparatus as in Example 10, and maintained at a temperature of 80° C. under a nitrogen atmosphere for 5 hours until a theoretical NCO equivalent amount of 374.4 was confirmed. The mixture was cooled to 30° C., and 109.2 parts of 2-hydroxyethylmethacrylate were added and allowed to react for 4 hours at 80° C., at which point a NCO % of 0.1% by weight was produced. 580.0 parts of dipropylene glycol monomethylether methacrylate, 0.08 parts of toluhydroquinone and 0.026 parts of tertiary butylcatechol were then added to produce a resin composition with a nonvolatile content of 40.0%. Furthermore, 8.5 parts of the epoxyacrylate resin of Example 9 and 17 parts of the unsaturated polyester resin obtained in Example 11 were added to 80 parts of the above resin to produce a resin composition with a nonvolatile content of 44.0%, and a Gardner viscosity of B–C. The resultant resin composition was then placed through the same evaluation tests as in Example 7, and the results are shown in Table 2.

TABLE 2

| Example | 7 | 8 | 9 | 10 | 11 | 12 | 13 |
|---|---|---|---|---|---|---|---|
| •Reduction of odorous properties | O | O | O | O | O | O | O |
| •Air-drying properties | O | O | Δ | Δ | O | O | O |
| •Tensile Strength [kgf/cm²] | 30 | 50 | 190 | 50 | 80 | 65 | 100 |
| •Tensile Extension Ratio [%] | 25 | 20 | 10 | 80 | 70 | 70 | 68 |
| •Water Resistance (25° C., 24 hr coefficient of water absorption [%]) | 1.2 | 1.0 | 1.0 | 1.4 | 1.6 | 3.5 | 1.4 |

EXAMPLE 14

PMMA Macromonomer 750 g of dipropylene glycol monomethylether methacrylate, 250 g of Macromer AA-6 (produced by Toa Gosei Chemical Industries, K.K.) and 0.2 g. of hydroquinone monomethylether were placed in a 2 liter flask containing four openings equipped with a thermometer, stirrer, inert gas introduction opening, and reflux condenser, respectively, and dissolved at a temperature of 50° C. Complete dissolution of the Macromer AA-6 resulted in the formation of a resin composition exhibiting a resin solid content of 25% and a viscosity of 94 cps. The resultant resin composition was then placed through the following evaluation tests, and these results are shown in Table 3.

<Evaluation Method>
I. Reduced odorous properties

The odor of the resin composition was evaluated by means of the same method as described above.

II. Air-drying properties 0.3 parts of N,N-bis-(2-hydroxyethyl)-p-toluidine and 2 parts of 50% benzoylperoxide were added per 100 parts of the resin composition, in addition to wax at 130°, 135°, 140° and 145° F. The state of the resin composition following curing was evaluated by means of touch (i.e., dry-to-touch): "O" indicates drying within 1 hour; "Δ" indicates drying within 3 hours; while "X" indicates insufficient drying within 3 hours following curing.

III. Tensile strength, tensile extension ratio and coefficient water absorption

The tensile strength, tensile extension ratio and coefficient of water absorption of the resin composition was evaluated by means of the same method as described above.

IV. Storage stability 0.3 parts of N,N-bis-(2-hydroxyethyl)-p-toluidine were added per 100 parts of the resin composition, in addition to wax at 130°, 135°, 140° and 145° F. The resultant resin composition was then placed in a dryer at 45° C. for 8 weeks, and the presence/absence of gelation of the resin composition was observed to evaluate the storage stability: "O" indicates the absence of resin gelation; while "X" indicates the occurrence of resin gelation.

EXAMPLE 15

PSt Macromonomer

Using, Macromer AS-6 (produced by Toa Gosei Chemical Industries, K.K.), the same procedure as in Example 14 was conducted to produce a resin composition exhibiting a resin solid content of 25% and a viscosity of 50 cps. The resultant resin composition was then placed through the same evaluation tests as in Example 14, and these results are shown in Table 3.

EXAMPLE 16

P(St-AN) Macromonomer

Using Macromer AN-6 (produced by Toa Gosei Chemical Industries, K.K.), the same procedure as in Example 14 was conducted to produce a resin composition exhibiting a resin solid content of 25% and a viscosity of 165 cps. The resultant resin composition was then placed through the same evaluation tests as in Example 14, and these results are shown in Table 3.

EXAMPLE 17

PSt Macromonomer 800 g of ion exchange water and 2 g of an aqueous solution of 10% acrylic acid (JURYMER AC-10H produced by Nihon Junyaku, K.K.) were placed and stirred in a 2 liter separable flask containing four openings equipped with a thermometer, stirrer, inert gas introduction opening, dropping, funnel and reflux condenser. A solution formed by dissolving 4 g of AIBN and 4 g of 3-mercaptopropionic acid in 400 g of styrene was then added. The resultant mixture was heated to 90° C., and the polymerization reaction was allowed to continue for 7 hours under a nitrogen atmosphere. The suspension polymer was then washed with water, filtered and dried for 24 hours at 60° C. to yield 395 g of a polymer (hereafter referred to as a "prepolymer (A)").

The resultant polymer exhibited a number average molecular weight (Mn) of 12,112 by GPC and an acid value of 4.2 mg KOH/g.

750 g of dipropylene glycol monomethylether methacrylate, 250 g of the aforementioned prepolymer (A), 2.7 g of glycidyl methacrylate, 0.2 g of hydroquinone monomethylether and 0.025 g of tetrabutylphosphonium bromide were placed in a 2 liter separable flask containing four openings equipped with a thermometer, stirrer, inert gas introduction opening, and reflux condenser, respectively, and allowed to react for 5 hours at a temperature of 80° C., under a nitrogen atmosphere. The reaction was completed when the reaction liquid reached an acid value of less than 0.2 mg KOH/g, resulting in the formation of a polystyrene macromonomer resin composition possessing a terminal methacryloyl group. The resultant resin composition was then placed through the same evaluation tests as in Example 14, and these results are shown in Table 3.

EXAMPLE 18

PMMA Macromonomer/Multi-functional Monomer 720 g of dipropylene glycol monomethylether methacrylate, 250 g of Macromer AA-6 (produced by Toa Gosei Chemical Industries, K.K.), 30 g of ethylene glycol dimethacrylate, and 0.2 g of hydroquinone monomethylether were placed in the same apparatus as in Example 14, and dissolved at a temperature of 50° C. Complete dissolution of the Macromer AA-6 resulted in the formation of a resin composition exhibiting a resin solid content of 25% and a viscosity of 380 cps. The resultant resin composition was then placed through the same evaluation tests as in Example 14, and these results are shown in Table 3.

EXAMPLE 19

Macromonomer/diethylene Glycol Monomethylether Methacrylate Resin Composition

A resin composition was produced as in Example 14 with the exception that diethylene glycol monomethylether methacrylate was used in place of dipropylene glycol monomethylether methacrylate. These results are shown in Table 3. (Note: "Macromer" refers to a trademark of Toa Gosei Chemical Industries, while "macromonomer" is a common, general term.)

EXAMPLE 20

PMMA Macromonomer/vinylester Resin 15 parts of the resin obtained in Example 9 and 15 parts of the dipropylene glycol monomethylether methacrylate were added to 70 parts of the resin obtained in Example 14 to produce a resin composition with a nonvolatile content of 25.0%, and a Gardner viscosity of B. The resultant resin composition was then placed through the same evaluation tests as in Example 14, and these results are shown in Table 3.

TABLE 3

| Example | 14 | 15 | 16 | 17 | 18 | 19 | 20 |
|---|---|---|---|---|---|---|---|
| •Reduction of odorous properties | O | O | O | O | O | O | O |
| •Air-drying properties | O | O | Δ | O | O | O | O |
| •Tensile Strength [kgf/cm²] | 49.5 | 50.3 | 53.6 | 70.9 | 87.3 | 28.3 | 80.5 |
| •Tensile Extension Ratio [%] | 234 | 244 | 223 | 207 | 58 | 98 | 53 |
| •Water Resistance (25° C., 24 hr coefficient of water absorption [%]) | 1.40 | 1.25 | 1.61 | 1.35 | 1.32 | 38.9 | 1.37 |
| •Storage Stability | O | O | O | O | O | O | O |

COMPARATIVE EXAMPLES 1–6

Solid resins obtained in Examples 1–6 were diluted using a styrene monomer until the non-volatile content of each matched that of the resin composition of the corresponding Example to form the resin compositions of the Comparative Examples 1–6. The resultant resin compositions were respectively subjected to the same evaluation tests as in Example 1, and these results are shown in Table 4.

TABLE 4

| Example | 1 | 2 | 3 | 4 | 5 | 6 |
|---|---|---|---|---|---|---|
| •Reduction of odorous properties | X | X | X | X | X | X |
| •Air-Drying | X | X | X | X | X | X |

TABLE 4-continued

| Example | 1 | 2 | 3 | 4 | 5 | 6 |
|---|---|---|---|---|---|---|
| •Tensile Strength [kgf/cm2] | 590.0 | 690.0 | 303.0 | 890.0 | 800.0 | 270.0 |
| •Tensile Extension Ratio [%] | 1.3 | 1.8 | 1.0 | 4.7 | 5.0 | 72.0 |
| •Adherence Hydrophilic Properties | X | X | X | X | X | Δ |
| •H$_2$O dispersibility | X | X | X | X | X | X |
| •Curability | — | — | — | — | — | — |

COMPARATIVE EXAMPLES 7~10

Resin composition were formed using the macromonomers obtained in Examples 14~17 which were dissolved in a styrene monomer until the resin solid content of each was 25%. The resultant resin compositions were respectively subjected to the same evaluation tests as in Example 14, and these results are shown in Table 5.

TABLE 5

| Example | 7 | 8 | 9 | 10 |
|---|---|---|---|---|
| Reduction of odorous properties | x | x | x | x |
| Air-drying properties | x | x | x | x |
| Tensile Strength [kgf/cm$^2$] | 344 | 350 | 320 | 389 |
| Tensile Extension Ratio [%] | 2.5 | 2.2 | 2.7 | 2.0 |
| Water Resistance (25° C., 24 hr coefficient of water absorption [%]) | 0.30 | 0.15 | 0.55 | 0.15 |

What is claimed is:

1. A radical-polymerizable curable resin composition comprising:

a polymer A containing a polymerizable unsaturated bonding group;

a polymerizable unsaturated monomer B; and a curing agent C;

wherein, said polymer A comprises at least one compound selected from the group consisting of unsaturated polyester, epoxy(meth)acrylate, urethane (meth)acrylate, unsaturated polyester (meth)acrylate, and a macromonomer containing a polymerizable unsaturated bonding group at a molecular terminal thereof; said polymerizable unsaturated monomer B comprises as an essential component an oligoalkyl(C$_2$-C$_4$) ether (n=2-15)-monoalkoxy(C$_1$-C$_{18}$)-(meth)acrylate; the curing agent comprises an organic peroxide, and the weight ratio of said polymer A to said polymerizable unsaturated monomer B is 70:30-15:85.

2. A radical-polymerizable curable resin composition according to claim 1, wherein said polymerizable unsaturated monomer B comprises as an essential component an oligoalkyl(C$_2$-C$_4$)ether(n=2-10)-monoalkoxy(C$_1$-C$_{18}$)-(meth)acrylate.

3. A radical-polymerizable curable resin composition according to claim 1 further comprising up to 5 parts by weight of a wax per a total of 100 parts by weight of said polymer A and said polymerizable unsaturated monomer B.

4. A coating material composition comprising a radical-polymerizable curable resin composition according to any one of claims 1–3.

5. A lining material comprising a radical-polymerizable curable resin composition according to any one of claims 1, 2, and 3.

6. A radical-polymerizable curable resin composition according to claim 1, wherein the weight ratio of said polymer A to said polymerizable unsaturated monomer B is 60:40–5:85.

* * * * *